United States Patent
Kim et al.

(10) Patent No.: US 11,065,785 B2
(45) Date of Patent: Jul. 20, 2021

(54) MASTER MOLD FOR WIRE GRID POLARIZER, WIRE GRID POLARIZER AND MANUFACTURING METHOD THEREOF, AND DISPLAY DEVICE HAVING WIRE GRID POLARIZER

(71) Applicant: Samsung Display Co., Ltd., Yongin-si (KR)

(72) Inventors: Han Su Kim, Seoul (KR); Dong Eon Lee, Seoul (KR); Se Hee Han, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 542 days.

(21) Appl. No.: 15/671,061

(22) Filed: Aug. 7, 2017

(65) Prior Publication Data
US 2018/0085973 A1     Mar. 29, 2018

(30) Foreign Application Priority Data
Sep. 29, 2016     (KR) .................. 10-2016-0125667

(51) Int. Cl.
*G02B 5/30* (2006.01)
*B29C 33/42* (2006.01)
*B29C 33/56* (2006.01)

(52) U.S. Cl.
CPC .............. *B29C 33/42* (2013.01); *B29C 33/56* (2013.01); *G02B 5/3058* (2013.01)

(58) Field of Classification Search
CPC ............................. G02B 5/3058; B29C 33/42
USPC ....................................... 359/485.05, 487.03
See application file for complete search history.

(56) References Cited

U.S. PATENT DOCUMENTS

| | | | |
|---|---|---|---|
| 8,248,696 B2 * | 8/2012 | Lines | G02B 5/0252 359/485.05 |
| 9,397,295 B2 | 7/2016 | Kim | |
| 9,557,462 B2 | 1/2017 | Minemura et al. | |
| 9,757,895 B2 * | 9/2017 | Lee | B29C 59/026 |

(Continued)

FOREIGN PATENT DOCUMENTS

| CN | 104076425 | 10/2014 |
|---|---|---|
| CN | 105607174 | 5/2016 |

(Continued)

OTHER PUBLICATIONS

Office Action dated Jan. 15, 2021, issued in Chinese Patent Application No. 201710844763.8.

*Primary Examiner* — Ricky D Shafer
(74) *Attorney, Agent, or Firm* — H.C. Park & Associates, PLC

(57) ABSTRACT

A master mold for manufacturing a wire grid polarizer includes a mold substrate and a mold part disposed on the mold substrate, in which the mold part includes a plurality of embossed portions extending in a first direction substantially in parallel with one another, a plurality of debossed portions, at least some of which are disposed between adjacent embossed portions, extending in the first direction and separating adjacent embossed portions, and an embossed bridge portion arranged in a second direction intersecting the first direction and connecting the plurality of embossed portions separated by the debossed portions. A wire grid polarizer and a method of manufacturing a wire grid polarizer are also disclosed.

6 Claims, 18 Drawing Sheets

(56) References Cited

U.S. PATENT DOCUMENTS

| | | | |
|---|---|---|---|
| 9,939,570 B2 | 4/2018 | Kim et al. | |
| 10,088,617 B2 * | 10/2018 | Ookawa | B05D 3/007 |
| 10,557,979 B2 * | 2/2020 | Kim | G02F 1/133617 |
| 2008/0117509 A1 * | 5/2008 | Hayashi | G02B 5/3058 |
| | | | 359/485.05 |
| 2009/0184441 A1 * | 7/2009 | Yang | B29C 33/3842 |
| | | | 264/316 |
| 2013/0287881 A1 * | 10/2013 | Iyama | B29C 33/42 |
| | | | 425/385 |
| 2015/0002791 A1 | 1/2015 | Nam et al. | |
| 2015/0234230 A1 * | 8/2015 | Hirata | G02B 5/3058 |
| | | | 349/96 |
| 2015/0314488 A1 * | 11/2015 | Hahm | B29C 33/3878 |
| | | | 216/52 |
| 2016/0033818 A1 * | 2/2016 | Lee | G02F 1/133528 |
| | | | 349/96 |
| 2016/0124265 A1 * | 5/2016 | Lee et al. | |
| 2016/0139313 A1 * | 5/2016 | Kim | G02B 5/3058 |
| | | | 359/485.05 |
| 2016/0161654 A1 * | 6/2016 | Yeo et al. | |
| 2016/0200033 A1 * | 7/2016 | Lee | B29C 59/002 |
| | | | 216/24 |
| 2018/0059477 A1 * | 3/2018 | Jang | G02F 1/133528 |

FOREIGN PATENT DOCUMENTS

| | | |
|---|---|---|
| JP | 2016-071306 | 5/2016 |
| KR | 10-2014-0139678 | 12/2014 |
| KR | 10-2015-0001022 | 1/2015 |

* cited by examiner

MASTER MOLD FOR WIRE GRID POLARIZER, WIRE GRID POLARIZER AND MANUFACTURING METHOD THEREOF, AND DISPLAY DEVICE HAVING WIRE GRID POLARIZER

CROSS-REFERENCE TO RELATED APPLICATION

This application claims priority from and the benefit of Korean Patent Application No. 10-2016-0125667 filed on Sep. 29, 2016, which is hereby incorporated by reference for all purposes as if fully set forth herein.

BACKGROUND

Field

The invention relates generally to wire grid polarizers used in electronic display devices and, more particularly, to master molds for manufacturing wire grid polarizers, wire grid polarizers, and manufacturing methods thereof that reduce defects that can cause deterioration in the optical characteristics of a display device incorporating a wire grid polarizer.

Discussion of the Background

A polarizer is an optical element that separates light having polarizing properties depending on a specific vibration direction from non-polarized light having various directions such as natural light. The polarizer has a wire grid shape or a striped shaped structure with a smaller pitch than a wavelength of light to be separated in order to separate it into light having polarizing properties.

In general, a polarizer has a pitch of about 20% of the wavelength in order to be used in a visible light region having a wavelength in the range of 400 nm to 700 nm. Accordingly, a polarizer having a pitch of at least 100 nm or less can be used in a visible light region.

However, in the case of a polarizer having such a pitch range, since the pitch interval is very small, there is a high possibility that a defect occurs during the manufacturing process. Defects in the manufacturing process deteriorate a product yield, thereby reducing productivity and deteriorating economic efficiency.

The above information disclosed in this Background section is only for enhancement of understanding of the background of the inventive concepts, and, therefore, it may contain information that does not form the prior art that is already known in this country to a person of ordinary skill in the art.

SUMMARY

Applicants have discovered that there is a need for a technique to prevent the occurrence of defects in manufacturing process of a polarizer having a fine pitch.

Master molds for manufacturing wire grid polarizers, wire grid polarizers, manufacturing methods thereof, and display devices constructed according to the principles of the invention have an embossed bridge portion that improves productivity by reducing the possibility of defects being generated during the manufacturing process.

Additional aspects will be set forth in the detailed description which follows, and, in part, will be apparent from the disclosure, or may be learned by practice of the inventive concepts.

According to one aspect of the invention, a master mold for manufacturing a wire grid polarizer includes a mold substrate and a mold part disposed on the mold substrate. The mold part includes a plurality of embossed portions extending in a first direction substantially in parallel with one another, a plurality of debossed portions, at least some of which are disposed between adjacent embossed portions, extending in the first direction and separating adjacent embossed portions, and an embossed bridge portion arranged in a second direction intersecting the first direction and connecting the plurality of embossed portions separated by the debossed portions.

A plurality of embossed bridge portions may be connected with adjacent embossed bridge portions.

The master mold may include a plurality of embossed bridge portions which are arranged continuously with adjacent embossed bridge portions.

The master mold may include a plurality of embossed bridge portions which are offset from adjacent embossed bridge portions.

The master mold may include a plurality of embossed bridge portions, and two or more embossed bridge portions may be disposed in one debossed portion.

The first direction and the second direction may be substantially perpendicular to each other.

The master mold may include a plurality of embossed bridge portions, and the mold part may include an uneven part having various heights defined at least in part by the plurality of embossed portions, the plurality of debossed portions, and the plurality of embossed bridge portions.

According to another aspect of the invention, a method of manufacturing a wire grid polarizer includes providing a first mold having a mold part formed on a first substrate in a pattern defined by a plurality of embossed portions extending in a first direction substantially in parallel with one another, a plurality of debossed portions extending between the plurality of embossed portions in the first direction and separating the plurality of embossed portions, and a plurality of embossed bridge portions extending in a second direction intersecting the first direction and connecting the plurality of embossed portions; forming a second mold by transferring the pattern of the first mold to a resin; coating a liquid resin on a second substrate and imprinting using the second mold; forming a mask by curing the imprinted liquid resin; and etching the second substrate contacting one surface of the mask.

The step of forming the second mold may include forming the second mold with a plurality of debossed imprinted portions corresponding to the plurality of embossed portions, a plurality of embossed imprinted portions corresponding to the plurality of debossed portions, and a plurality of debossed imprinted bridge portions corresponding to the plurality of embossed bridge portions such that the resin filled in the debossed imprinted portion flows therein.

The step of providing the first mold having a mold part may include forming the mold part in a photoresist process.

The step of coating the liquid resin may include using an inkjet method.

The second substrate may include a metal layer and an anti-metal oxidation layer. The step of etching the second substrate may include etching the anti-metal oxidation layer using the mask and etching the metal layer using the etched anti-metal oxidation layer.

The step of providing the first mold having the mold part may include providing an uneven part having various heights defined at least in part by the plurality of embossed portions, the plurality of debossed portions, and the plurality of embossed bridge portions According to another aspect of the invention, a wire grid polarizer includes a plurality of embossed grid portions extending in a first direction substantially in parallel with one another and a plurality of embossed grid bridge portions extending between the plurality of embossed grid portions in a second direction intersecting the first direction and connecting at least some of the plurality of embossed grid portions separated by a plurality of debossed grid portions to each other.

The plurality of embossed grid bridge portions may be connected with adjacent embossed grid bridge portions.

The plurality of embossed grid bridge portions may be offset from adjacent embossed grid bridge portions.

Two or more embossed grid bridge portions may connect a pair of embossed grid portions.

The first direction and the second direction may be substantially perpendicular to each other.

According to another aspect of the invention, a display device includes a display panel including a wire grid polarizer and a color conversion panel disposed on the display panel. The wire grid polarizer includes a plurality of embossed grid portions extending in a first direction substantially in parallel with one another and a plurality of embossed grid bridge portions extending between the plurality of embossed grid portions in a second direction intersecting the first direction and connecting at least some of the plurality of embossed grid portions separated by a plurality of debossed grid portions to each other.

The color conversion panel may include a plurality of color conversion layers configured to change wavelengths of light passing through the display panel and a light blocking member disposed between the plurality of color conversion layers. The plurality of embossed grid bridge portions may contact and may overlap the light blocking member.

The plurality of color conversion layers may include quantum dots.

Accordingly, waster molds for manufacturing wire grid polarizers, wire grid polarizers, and display devices constructed according to the principles of the invention are capable of preventing deterioration of optical characteristics caused by defects that may be generated in the manufacturing process of the wire grid polarizer and thereby improve product quality. For example, although the liquid resin is coated by the embossed portions and the debossed imprinted portions in order to form the embossed grid bridge portions in the second direction that intersects the first direction in which the embossed grid portions of the wire grid polarizer extend, it is possible to prevent defects caused by capillary phenomenon and spread anisotropy of the liquid resin.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
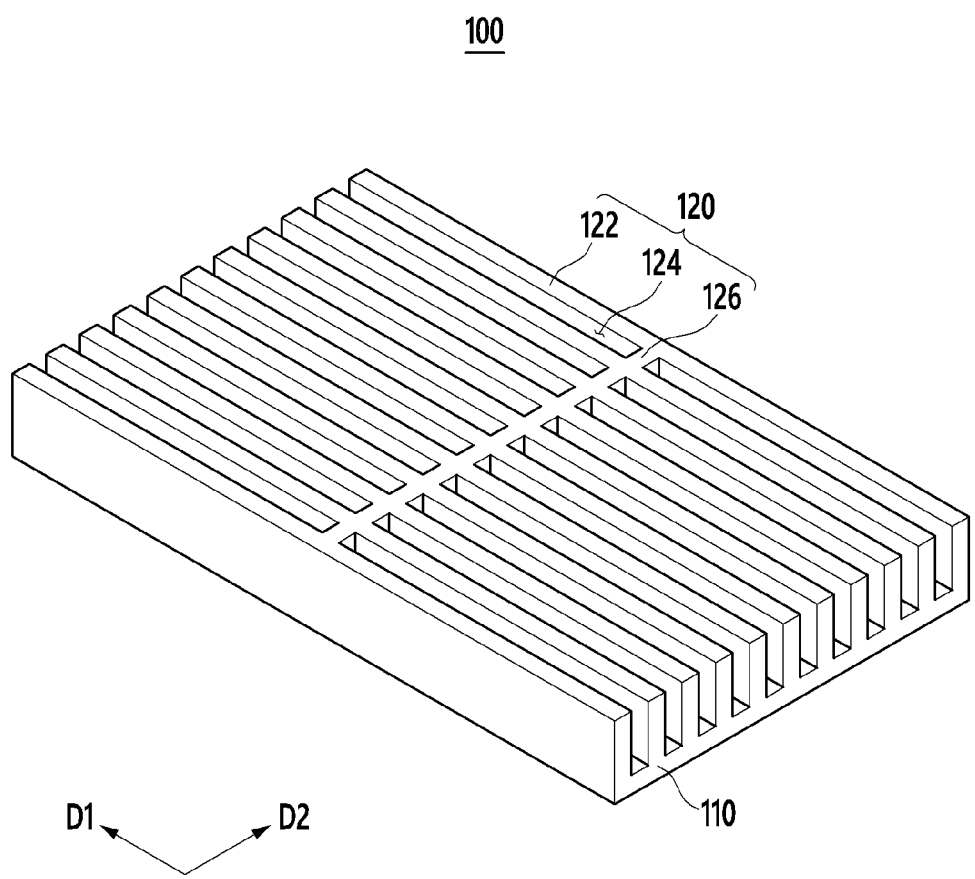
FIG. 1 is a schematic perspective view of an embodiment of a master mold for manufacturing a wire grid polarizer constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 a schematic perspective view of an embodiment of a master mold for manufacturing a wire grid polarizer constructed according to the principles of the invention. As illustrated in FIG. 1, a master mold 100 for manufacturing a wire grid polarizer according to an exemplary embodiment includes a mold substrate 110 and a mold uneven part 120.

The mold substrate 110 may serve as a substrate for manufacturing the master mold 100, and may be formed of any material known in the art including a metal. The mold uneven part 120 is formed by processing a surface of the mold substrate 110 to have protrusions and depressions. According to an exemplary embodiment, the mold uneven part 120 may be formed using a master mold-manufacturing mask having a precise pattern by a laser cutting process and using a photoresist process, but the inventive concepts are not limited thereto.

According to an exemplary embodiment, the mold uneven part 120 includes embossed (raised) portions 122, debossed (recessed) portions 124, and embossed (raised) bridge portions 126 that may connect adjacent embossed portions. In other words, the mold uneven part 120 is a part of the mold having various heights defined at least in part by the embossed portions 122, the debossed portions 124, and the embossed bridge portions 126. The embossed portions 122 have a first height, the debossed portions 124 have a second height, and the embossed bridge portions 126 have a third height which is substantially the same with the first height.

The embossed portions 122 are disposed in parallel with one another in a first direction to have a stripe-like pattern. Similar to the embossed portions 122, the debossed portions 124 are disposed in parallel with one another in the first direction, and each of the debossed portions 124 is provided between corresponding adjacent embossed portions 122 to separate the adjacent embossed portions 122. According to an exemplary embodiment, the debossed portions 124 may be formed by partially removing the mold substrate 110 by a laser cutting process, but the inventive concepts are not limited thereto.

The master mold 100 has a wall at a longer side of the mold substrate 110. The wall is one of the embossed portions. The master mold 100 may be separated from the outside by the wall. The master mold 100 also has an opened part at a shorter sides of the mold substrate 110. The opened part is formed by the debossed portions 124.

The embossed bridge portions 126 extend across the debossed portions 124 in a second direction that intersects the first direction. According to an exemplary embodiment, the embossed bridge portions 126 connect the embossed portions 122, which are separated by the debossed portions 124. In this case, as illustrated in FIG. 1, the embossed bridge portions 126 may be connected with other embossed bridge portions 126 adjacent thereto.

Figure 2:
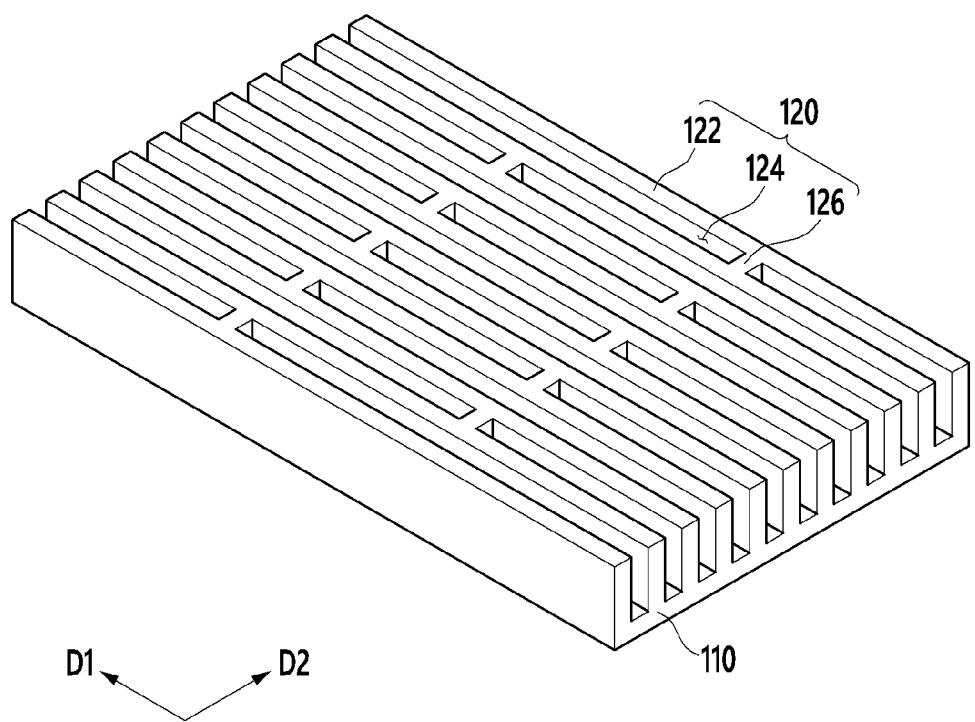
FIG. 2 is a perspective view of another embodiment of a master mold for manufacturing a wire grid polarizer constructed according to the principles of the invention.
Figure 3:
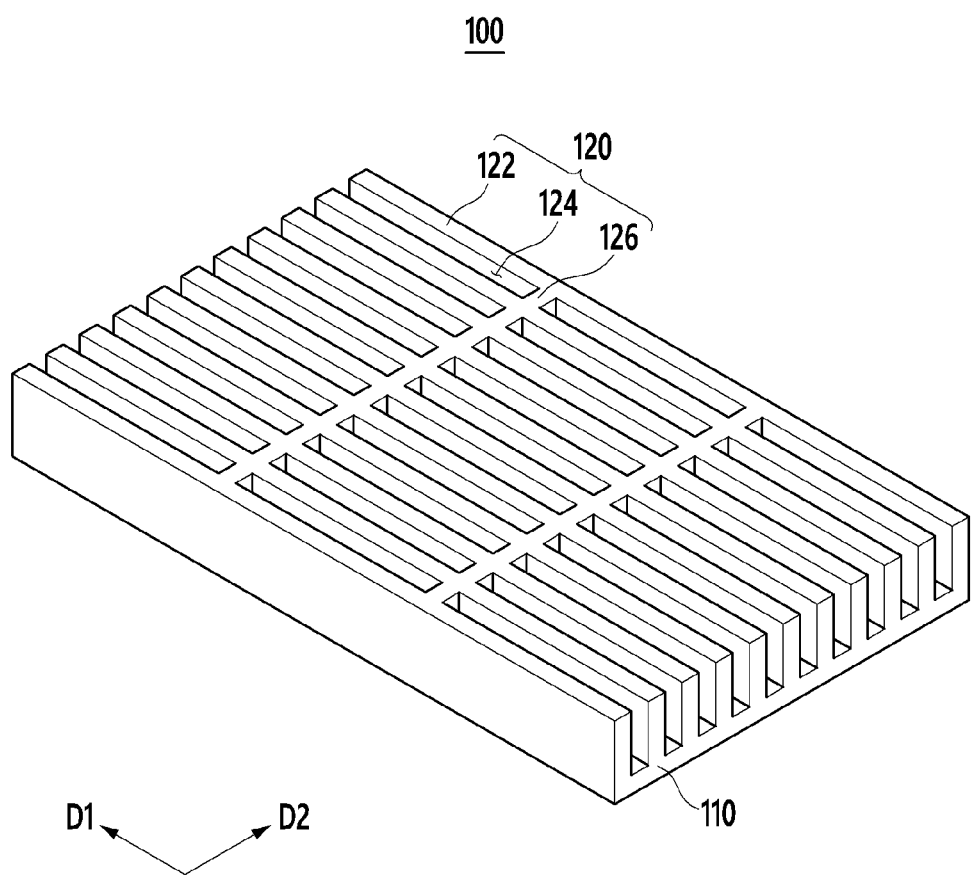
FIG. 3 is a perspective view of yet another embodiment of a master mold for manufacturing a wire grid polarizer constructed according to the principles of the invention.

Exemplary modifications of the master mold 100 are illustrated in FIG. 2 and FIG. 3. FIG. 2 is a perspective view of another embodiment of a master mold for manufacturing a wire grid polarizer constructed according to the principles of the invention, in which the embossed bridge portions 126 are offset or misaligned from other embossed bridge portions 126 adjacent thereto. Offset means each of the embossed bridge portions 126 is arranged independently, not continuously with the adjacent embossed bridge portion, as shown in FIG. 2. FIG. 3 is a perspective view of yet another embodiment of a master mold for manufacturing a wire grid polarizer constructed according to the principles of the invention, in which two or more embossed bridge portions 126 are included in one debossed portion 124 such that a pair of embossed portions 122 are connected with each other by the two or more embossed bridge portions 126.

As illustrated in FIG. 1 to FIG. 3, the first direction in which the embossed portions 122 and the debossed portions 124 of the master mold 100 extend may be perpendicular to the second direction in which the embossed bridge portions 126 extend. However, this is merely an example. Any case in which the first direction and the second direction intersect each other may be employed.

In FIG. 1 to FIG. 3, the master mold 100 includes the embossed bridge portions 126 for connecting the embossed portions 122. The master mold 100 may be subjected to a process for manufacturing an imprinting mold 200 by having its pattern transferred in a molding operation. The manufactured imprinting mold 200 may be used to manufacture a wire grid polarizer using a liquid resin coated by an inkjet method. A detailed manufacturing method will be described subsequently in conjunction with the exemplary wire grid manufacturing method illustrated in FIG. 9 to FIG. 14.

The liquid resin has spread anisotropy caused by capillary phenomenon. Accordingly, the liquid resin is easily spread in the first direction in which the debossed portions 124 are formed, while the liquid resin is not easily spread in the second direction that crosses the first direction. Thus, a defect in which the liquid resin is incompletely filled in between the debossed portions 124 may occur.

This defect may deteriorate an optical characteristic of a wire grid polarizer, and such deterioration may adversely affect a display device including the wire grid polarizer.

However, the master mold 100 illustrated in FIG. 1 to FIG. 3 includes the embossed bridge portions 126 which can overcome this defect by forming a path through which the liquid resin can flow in the second direction.

Since the embossed bridge portions 126 connect the embossed portions 122, liquid resin can flow between debossed imprinted portions as described subsequently with reference to FIG. 4 to FIG. 8. Accordingly, it is possible to prevent optical characteristic deterioration caused by a defect that may be generated during manufacturing process of a wire grid polarizer, thereby improving product quality.

The debossed imprinted portions will be described subsequently in more detail in relation to a manufacturing method of a wire grid polarizer using the aforementioned master mold with reference to FIG. 4 to FIG. 8.

According to an exemplary embodiment, a manufacturing method of a wire grid polarizer may generally include the steps of providing a master mold for manufacturing a wire grid polarizer, forming an imprinting mold, imprinting, forming a mask, and manufacturing a wire grid polarizer.

As described above, in the step of providing the master mold 100, the master mold 100 may include the embossed portions 122, the debossed portions 124, and the embossed bridge portions 126 disposed in the debossed portions 124 to connect the embossed portions 122.

According to an exemplary embodiment, the embossed portions 122, the debossed portions 124, and the embossed bridge portions 126 may be formed in the master mold 100 using a laser cutting method. Specifically, the debossed portions 124 may be formed by removing some of the mold substrate 110 at a region corresponding to the debossed portions 124 by laser cutting to form the embossed portions 122 and the embossed bridge portions 126.

A detailed description related to the manufacturing the master mold 100 in the present step is substantially the same as that of the master mold 100 described above. As such, duplicative descriptions are largely omitted to avoid redundancy.

In the step of forming an imprinting mold, the imprinting mold may be formed by transferring the pattern of the master mold 100 by use of a mold resin. According to an exemplary embodiment, the mold resin may be coated with a liquid to transfer the pattern of the master mold 100 by an imprinting method. The imprinting mold may be formed by curing the mold resin by light or heat after the master mold 100 is imprinted on the liquid mold resin.

Figure 4:
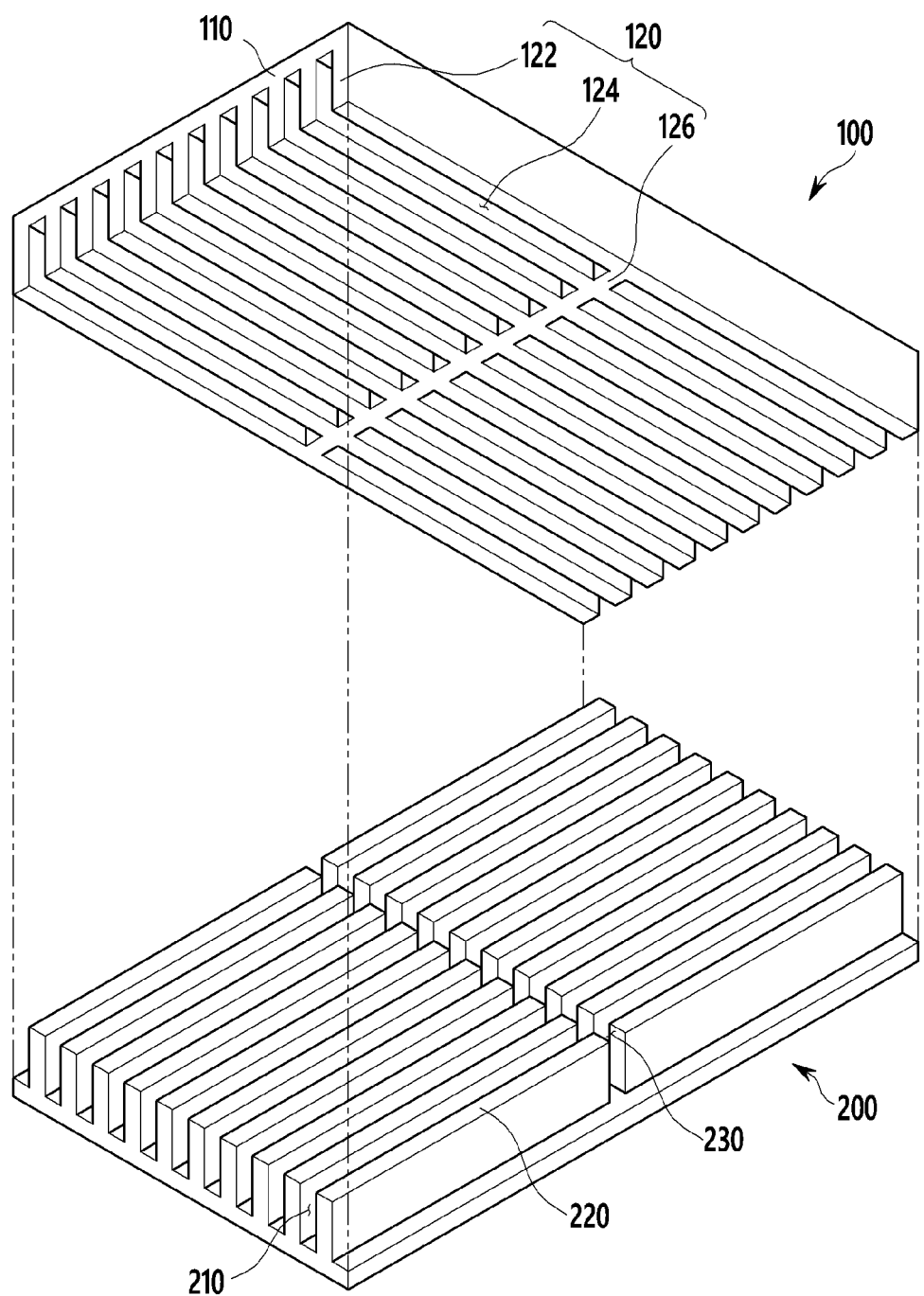
FIG. 4 is a schematic perspective view of the master mold of FIG. 1 and an imprinting mold created by the master mold.

FIG. 4 is a schematic perspective view of the master mold of FIG. 1 and an imprinting mold created by the master mold. As illustrated in FIG. 4, according an exemplary embodiment, an imprinting mold 200 created by master mold 100 includes debossed imprinted portions 210, embossed imprinted portions 220, and debossed imprinted bridge portions 230.

The debossed imprinted portions 210 correspond to the embossed portions 122 of the master mold 100, and the embossed imprinted portions 220 correspond to the debossed portions 124 of the master mold 100. Since the imprinting mold 200 is formed by transferring the pattern of the master mold 100 by imprinting, embossed parts and debossed parts of the master mold 100 and the imprinting mold 200 are oppositely formed, as is known in the art, like a negative and positive image.

Thus, the debossed imprinted bridge portions 230 of the imprinting mold 200 correspond to the embossed bridge portions 126 of the master mold 100. In this case, a bridge pattern of the imprinting mold 200 is debossed. Accordingly, when a liquid mask resin is coated onto the imprinting mold, the liquid mask resin may flow between the debossed imprinted portions 210 through the debossed imprinted bridge portions 230.

The imprinting mold 200 also has a side wall at a longer sides and an opened part at a shorter sides of the imprinting mold 200, respectively. The side wall is one of the embossed imprinted portions 220 and the opened part is formed by the debossed imprinted portions 210.

The step of imprinting using a mask resin will be described subsequently in detail with reference to FIG. 5 to FIG. 7.

Figure 5:
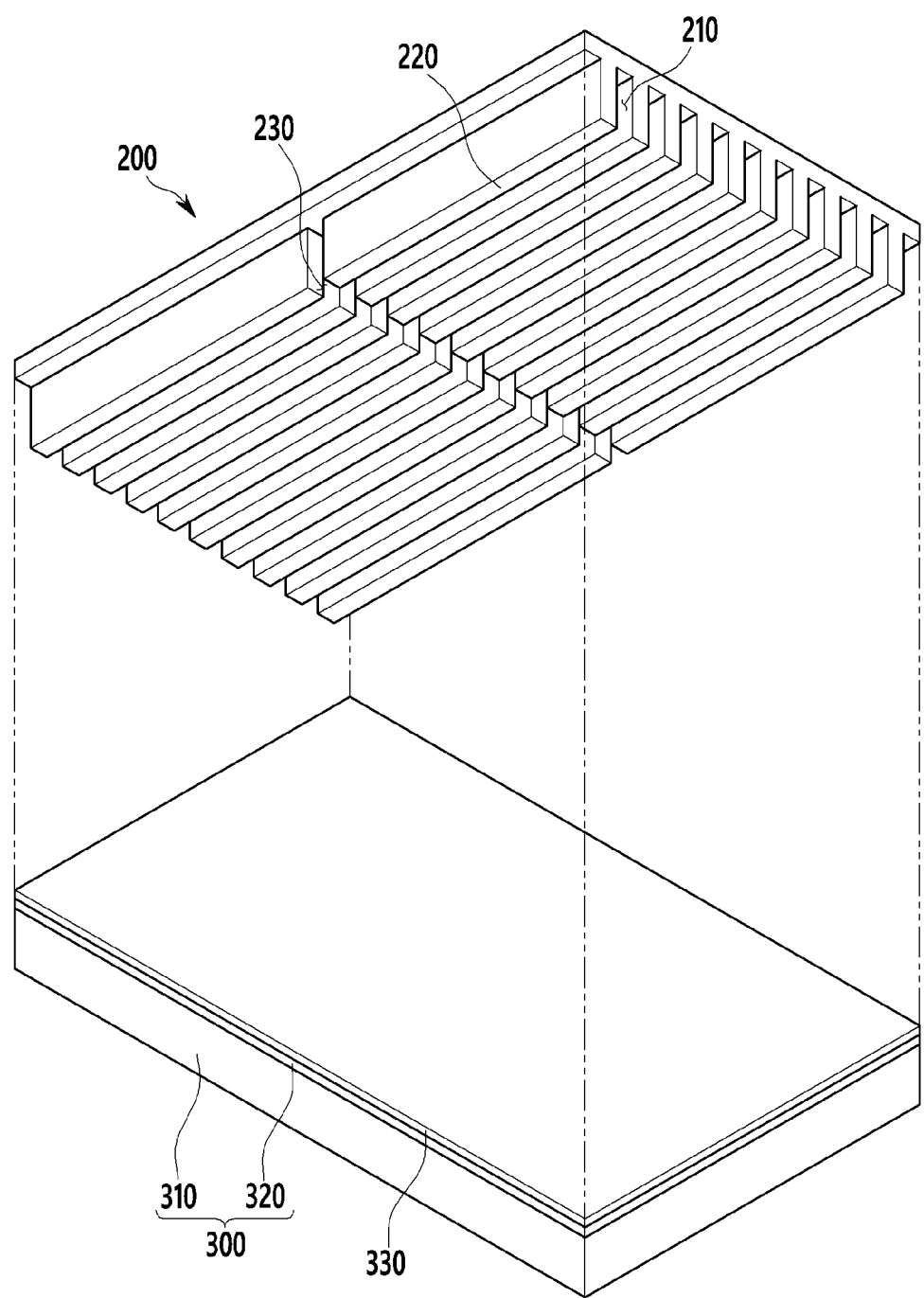
FIG. 5 is a schematic perspective view of the imprinting mold of FIG. 4 and a mask resin coated on a wire grid polarizer substrate showing an exemplary imprinting process used to form a mask on the wire grid polarizer substrate.
Figure 6:
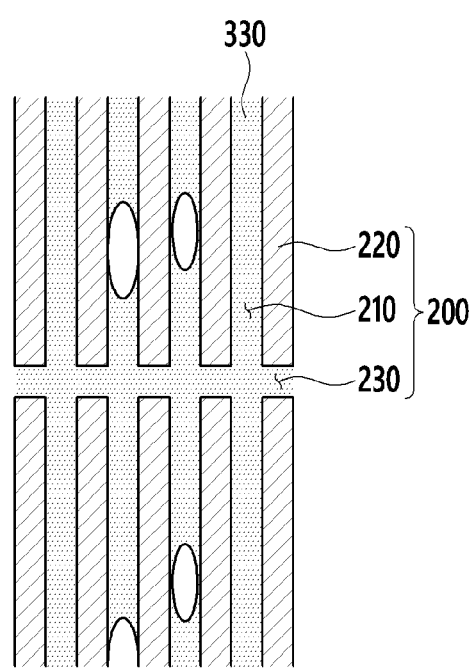
FIG. 6 is a schematic plan view of a portion of the imprinting mold of FIG. 5 showing how mask resin is filled in the imprinting mold.
Figure 6:
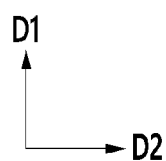
Figure 7:
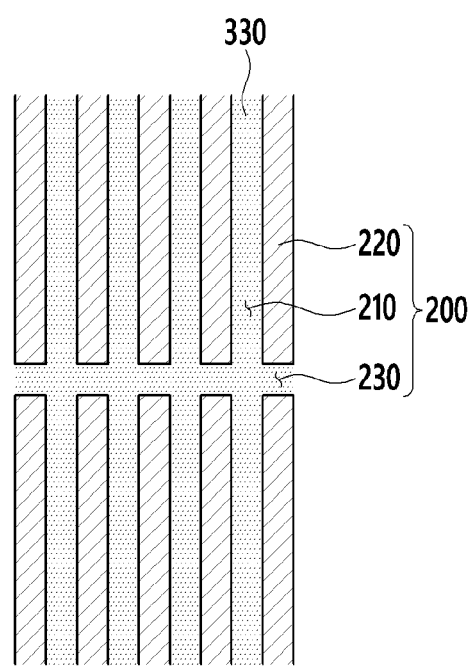
FIG. 7 is a schematic plan view of a portion of the imprinting mold of FIG. 5 showing the condition in which mask resin completely fills the imprinting mold.
Figure 7:
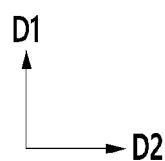

FIG. 5 is a schematic perspective view of the imprinting mold of FIG. 4 and a mask resin coated on a wire grid polarizer substrate showing an exemplary imprinting process used to form a mask on the wire grid polarizer substrate, FIG. 6 is a schematic plan view of a portion of the imprinting mold of FIG. 5 showing how mask resin is filled in the imprinting mold, and FIG. 7 is a schematic plan view of a portion of the imprinting mold of FIG. 5 showing the condition in which mask resin completely fills the imprinting mold.

According to an exemplary embodiment, in the step of imprinting, a liquid mask resin 330 is coated, and an imprinting process is performed on the coated mask resin 330 using the imprinting mold 200. FIG. 5 to FIG. 7 schematically illustrate a filling operation of the mask resin 330 to be filled in the debossed imprinted portions 210 in order to facilitate understanding of the capillary phenomenon caused by the liquid mask resin 330 disposed in the narrow spaces between the inner walls of the debossed imprinted portions 210.

As shown in FIG. 5, when approaching an edge of the imprinting mold 200, the liquid mask resin 330 is first moved along the inner walls of the debossed imprinted portions 210. The liquid mask resin 330 that is moved along the inner walls of the debossed imprinted portions 210 gradually fills the spaces inside the debossed imprinted portions 210. As illustrated in FIG. 6, the liquid mask resin 330 may sequentially fill the spaces inside of the debossed imprinted portions 210 as the liquid mask resin moves from the edge of the debossed imprinted portions 210 toward the inside.

Since the liquid mask resin 330 has spread anisotropy, the liquid mask resin 330 may easily flow in the first direction, but may not easily flow in the second direction. Accordingly, when the debossed imprinted portions 210 are extend a large distance in the first direction, a defect in which the liquid mask resin 330 does not completely filled inside the debossed imprinted portions 210 may occur.

However, according to an exemplary embodiment, the imprinting mold 200 includes the debossed imprinted bridge portions 230 formed in the second direction, and thus the liquid mask resin 330 may flow to the debossed imprinted portions 210 adjacent thereto through the debossed imprinted bridge portions 230. When the movement is completed, the liquid mask resin 330 may be completely filled in the debossed imprinted portions 210 and debossed imprinted bridge portions 230 of the imprinting mold 200 as illustrated in FIG. 7.

Accordingly, the liquid mask resin 330 may flow to the adjacent debossed imprinted portions 210 via the debossed imprinted bridge portions 230, thereby reducing rate of generating defecting in a mask that is formed by the mask resin 330.

Figure 8:
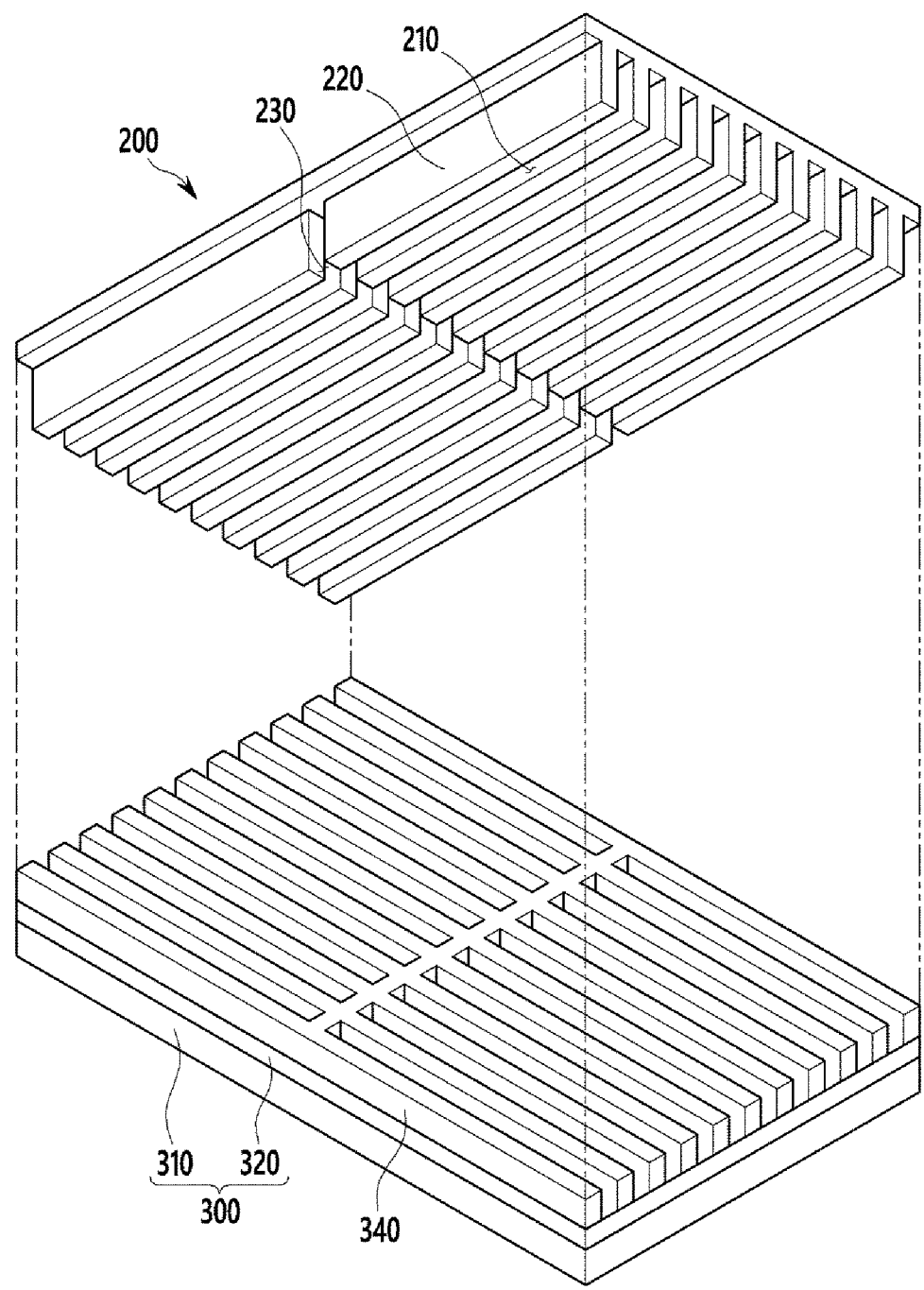
FIG. 8 is a schematic perspective view of the imprinting mold of FIG. 5 and a mask manufactured on the wire grid polarizer substrate of FIG. 5.

FIG. 8 is a schematic perspective view of the imprinting mold of FIG. 5 and a mask manufactured on the wire grid polarizer substrate of FIG. 5. The mask 340 illustrated in FIG. 8 may be obtained by curing the mask resin 330 filled between the embossed pattern of the imprinting mold 200 in FIG. 7 by light or heat and separating it from the imprinting mold 200.

FIG. 9 to FIG. 14 are schematic side views of a wire grid polarizer substrate, an imprinting mold, and a mask sequentially illustrating a manufacturing method of a wire grid polarizer according to the principles of the invention. FIG. 9 to FIG. 14 schematically illustrate portions of the wire grid polarizer substrate 300 and the imprinting mold 200 viewed from a side in the first direction. In this case, the illustration of the debossed imprinted bridge portions 230 formed in the imprinting mold 200 in the second direction and embossed pattern formed in the mask 340 to correspond to the debossed imprinted bridge portions 230 is omitted.

Figure 9:
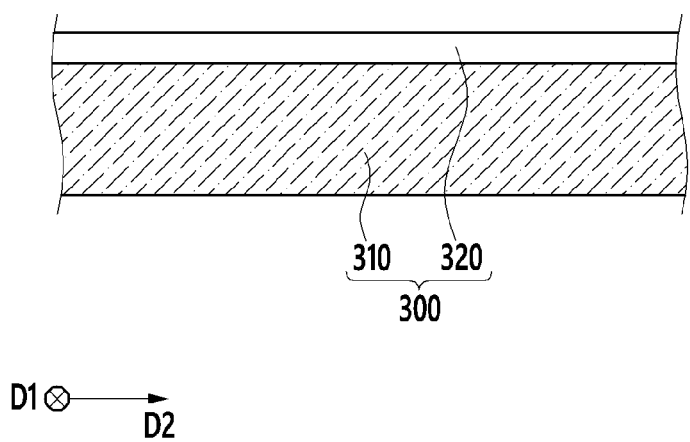
FIG. 9 to FIG. 14 are schematic side views of a wire grid polarizer substrate, an imprinting mold, and a mask sequentially illustrating a manufacturing method of a wire grid polarizer according to the principles of the invention.

FIG. 9 illustrates the step of preparing the wire grid polarizer substrate 300 including a metal layer 310 and an anti-metal oxidation layer 320 according to an exemplary embodiment. The metal layer 310 may include aluminum (Al), and the anti-metal oxidation layer 320 may include at least one of a metal such as titanium (Ti) for preventing oxidation of a metal including aluminum, an oxide of such a metal, an inorganic material such as a silicon oxide ($SiO_x$) and a silicon nitride ($SiN_x$), and an organic material having such low reactivity with oxygen or moisture so as to prevent oxidation of the metal layer 310.

According to an exemplary embodiment, the metal layer 310 may be formed into embossed grid portions of a wire grid polarizer by etching. This will be described subsequently in detail with reference to FIG. 14.

Figure 10:
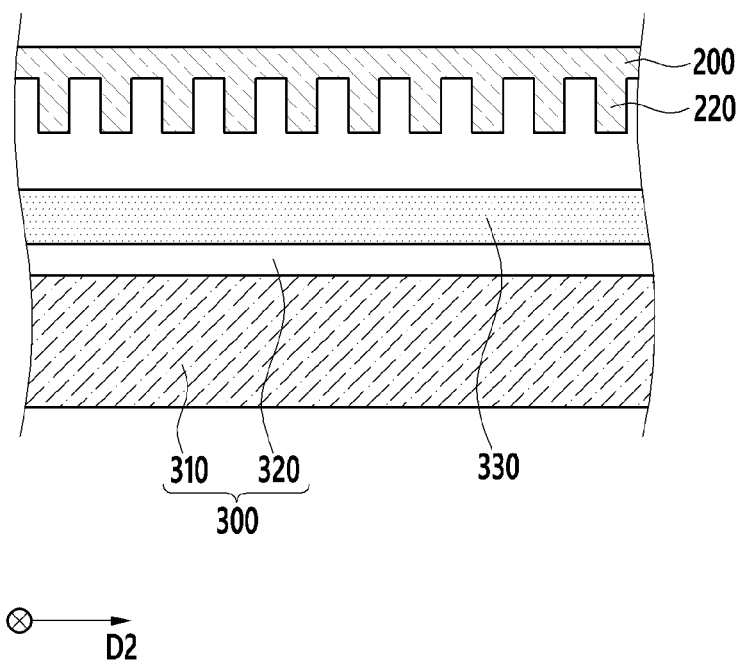

FIG. 10 illustrates the state in which the liquid mask resin 330 is coated on the wire grid polarizer substrate 300 and is subjected to an imprinting process using the imprinting mold 200. The mask resin 330 may be imprinted using the imprinting mold 200, and then may be cured by using light or heat to be separated as illustrated in FIG. 8.

However, the inventive concepts are not limited thereto. For example, in the case of using the mask resin 330 having viscosity or intensity that is enough to maintain the imprinted structure after the imprinting mold 200 is separated, the imprinting mold 200 may be cured by light of heat after being separated from the mask resin 330. As a result, the mask 340 in which embossed and debossed parts are formed oppositely to those of the imprinting mold 200 is manufactured as illustrated in FIG. 11.

FIG. 10 illustrates the step in which the liquid mask resin 330 is coated on the wire grid polarizer substrate 300 to perform an imprinting process thereon according to an exemplary embodiment, but the inventive concepts are not limited thereto. Fro example, the imprinting process may be formed in the sequence in which the mask resin 330 is coated on the imprinting mold 200, and then the wire grid polarizer substrate 300 is attached to the imprinting mold 200 coated with the mask resin 330. Accordingly, changes in the order of attaching the wire grid polarizer substrate 300 and forming the mask 340 may be made without departing from the scope of the inventive concepts.

Figure 11:
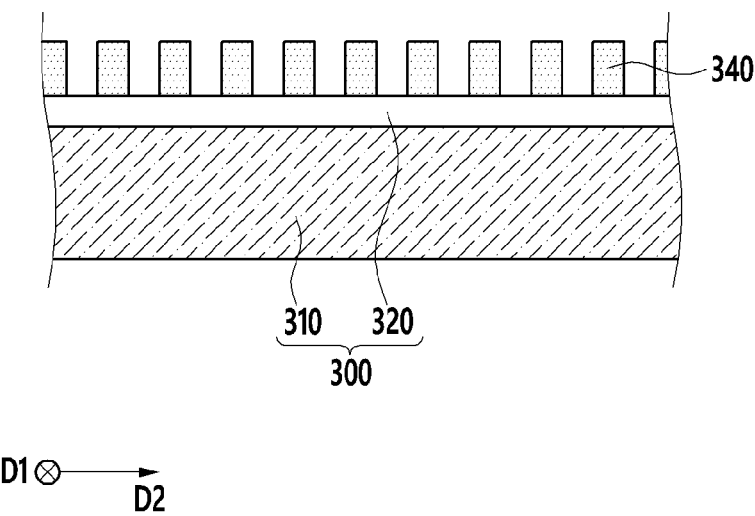

FIG. 11 illustrates how the mask 340 is formed on the wire grid polarizer substrate 300. Although not illustrated in FIG. 8, the state in which the wire grid polarizer substrate 300 is disposed at one surface of the mask 340 as illustrated in FIG. 8, viewed in the first direction, may be substantially the same as illustrated in FIG. 11.

Figure 12:
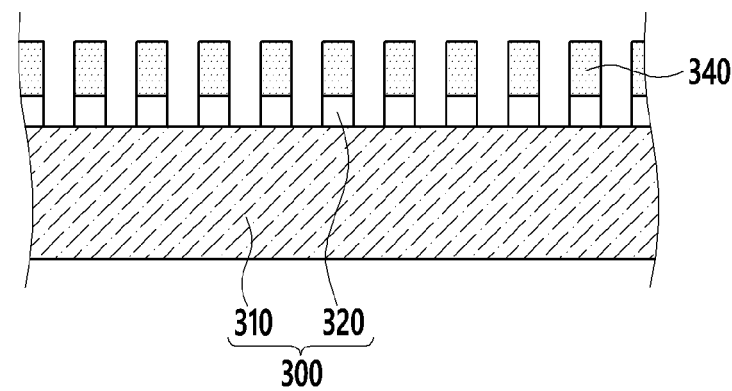

FIG. 12 illustrates a first etching step of etching the anti-metal oxidation layer 320 on the wire grid polarizer substrate 300. According to an exemplary embodiment, the wire grid polarizer substrate 300 includes the anti-metal oxidation layer 320 on one surface of the metal layer 310, and thus it is difficult to etch the metal layer 310 having a surface that is coated with the anti-metal oxidation layer 320. Accordingly, the first etching step for removing the anti-metal oxidation layer 320 may be performed before etching the metal layer 310.

According to an exemplary embodiment, the first etching step may be performed using dry etching, but the inventive concepts are not limited thereto. Any process for removing the anti-metal oxidation layer 320 including at least one of a metal, a metal oxide, an inorganic material, and an organic material may be used.

Figure 13:
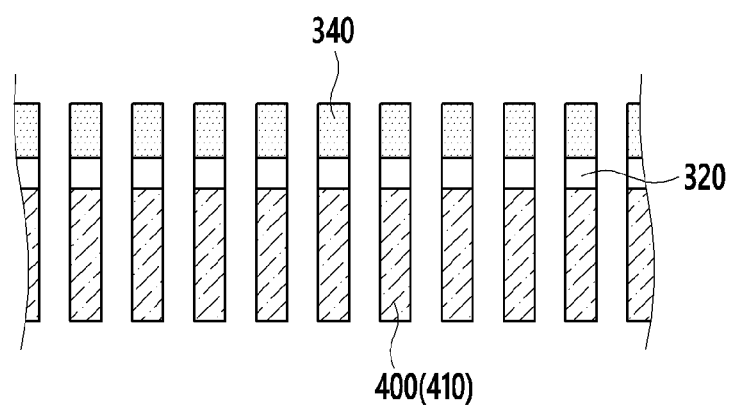

Next, as illustrated in FIG. 13, a second etching step of etching the metal layer 310 may be performed. The metal layer 310 is completely etched to extend therethrough such that no material remains. A portion of the metal layer 310 that remains after the second etching step serves as a wire grid polarizer 400 to be described below. Specifically, the remaining portion of the metal layer 310 may serve as embossed grid portions 410 of the wire grid polarizer 400.

According to an exemplary embodiment, the second etching step may employ a wet etching method for etching the metal layer 310, but the inventive concepts are not limited thereto. Alternatively, various methods for etching the metal layer 310 may be employed. Any method or process capable of removing a portion of the metal layer 310, which is not covered by the mask 340, may be included in the scope of the inventive concepts.

Figure 14:
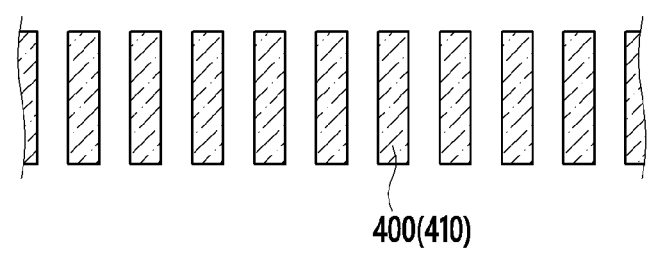

When the etching is completed, the step of removing the anti-metal oxidation layer 320 and the mask 340 remaining on the embossed grid portions 410 of the wire grid polarizer 400 is performed as illustrated in FIG. 14.

Next, as necessary, a metal material may be deposited on the wire grid polarizer 400 using a sputtering method or a chemical vapor deposition (CVD) method. As a result, the wire grid polarizer 400 may be completely manufactured.

Figure 15:
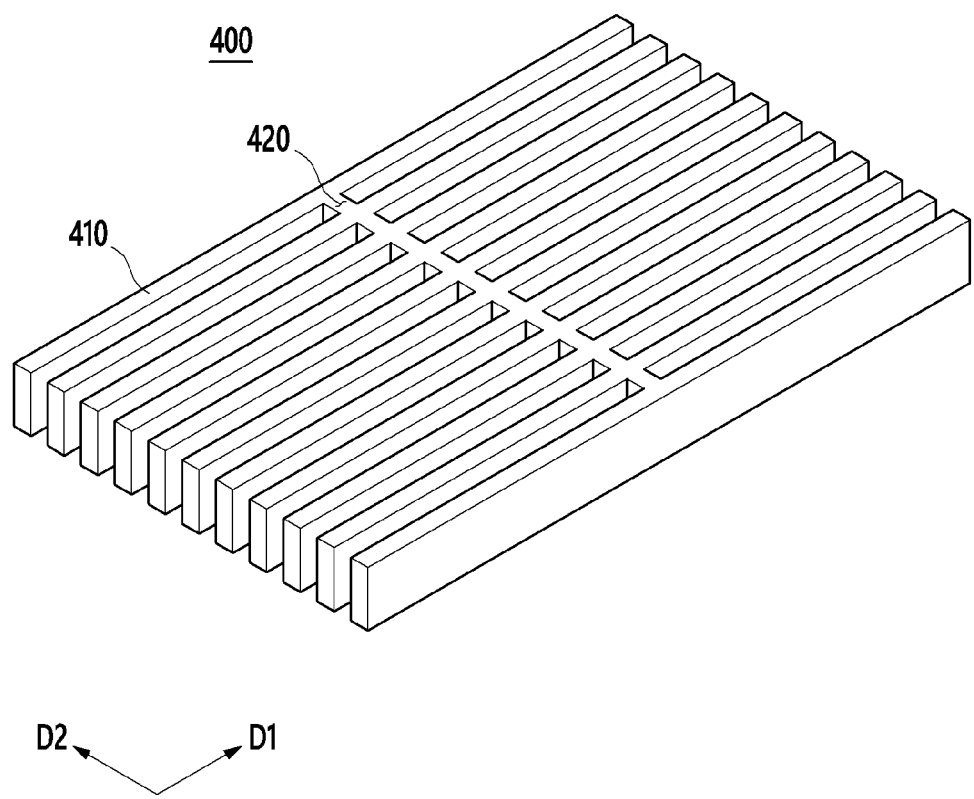
FIG. 15 is a schematic perspective view of a wire grid polarizer manufactured using the manufacturing method illustrated in FIG. 9 to FIG. 14.

Hereinafter, the wire grid polarizer 400 manufactured through a manufacturing method illustrated in FIG. 9 to FIG. 14 will be described. FIG. 15 is a schematic perspective view of a wire grid polarizer manufactured using the manufacturing method illustrated in FIG. 9 to FIG. 14.

A wire grid polarizer 400 illustrated in FIG. 15 is manufactured through an etching process using the mask 340 illustrated in FIG. 8, and thus has a same shape as the mask 340 illustrated in FIG. 8. Therefore, according to an exemplary embodiment, the wire grid polarizer 400 includes embossed grid portions 410 and embossed grid bridge portions 420 as illustrated in FIG. 15.

The embossed grid portions 410 are disposed substantially in parallel with one another in the first direction, and the embossed grid bridge portions 420 are disposed between the embossed grid portions 410 in the second direction that intersects the first direction. The embossed grid bridge portions 420 connect two adjacent embossed grid portions 410.

According to an exemplary embodiment, the structure of the wire grid polarizer 400 is obtained by forming the imprinting mold 200 using the master mold 100 illustrated in FIG. 1, forming the mask 340 on the wire grid polarizer substrate 300 using the imprinting mold 200, and partially etching the wire grid polarizer substrate 300 to correspond to the mask 340, and accordingly the completed wire grid polarizer 400 has the same uneven part as that of the master mold 100 illustrated in FIG. 1. The embossed grid bridge portions 420 may be connected with other embossed grid bridge portions 420 adjacent thereto as illustrated in FIG. 15.

According to modifications of an exemplary embodiment, the wire grid polarizer 400 may also correspond to the structure of the master mold 100 illustrated in FIG. 2 and FIG. 3. As a result, although not separately illustrated, as with the master mold 100 illustrated in FIG. 2, the embossed grid bridge portions 420 may also be disposed to be offset or misaligned from embossed grid bridge portions 420 adjacent thereto. In addition, as with the master mold 100 illustrated in FIG. 3, two or more embossed grid bridge portions 420 may be disposed between a pair of embossed grid portions 410 to connect the pair of embossed grid portions 410.

Similar to the description of the master mold 100, the first direction in which the embossed grid portions 410 extend may be perpendicular to the second direction in which the embossed grid bridge portions 420 are extended. Also, similar to the description of the master mold 100, the wire grid polarizer 400 has a side wall at a longer sides and an opened part at a shorter sides of the wire grid polarizer 400, respectively. The side wall is one of the embossed grid portions 410 and the opened part is formed between the embossed grid portions 410.

Figure 16:
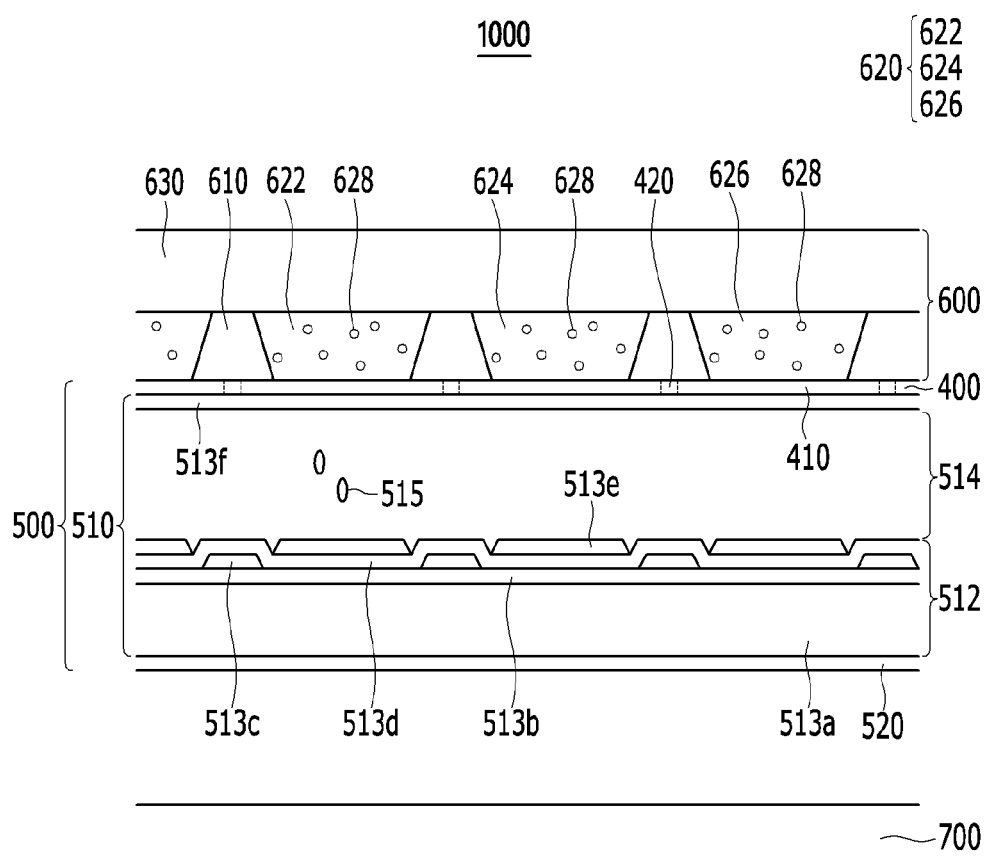
FIG. 16 is a schematic cross-sectional view of an embodiment of a display device constructed according to the principles of the invention.
Figure 17:
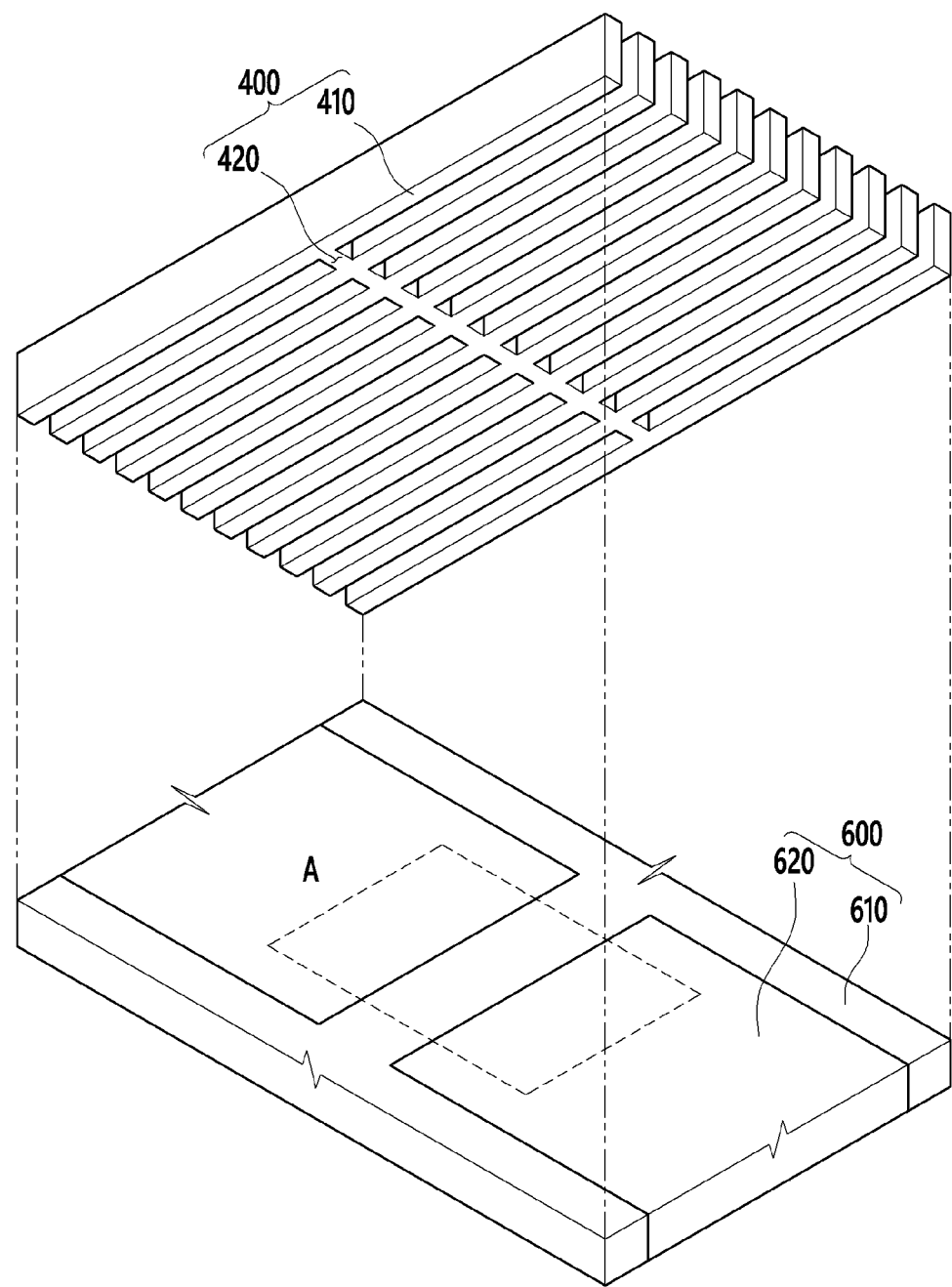
FIG. 17 is a schematic perspective view of the wire grid polarizer of FIG. 15 and a portion of the color conversion panel of FIG. 16.
Figure 18:
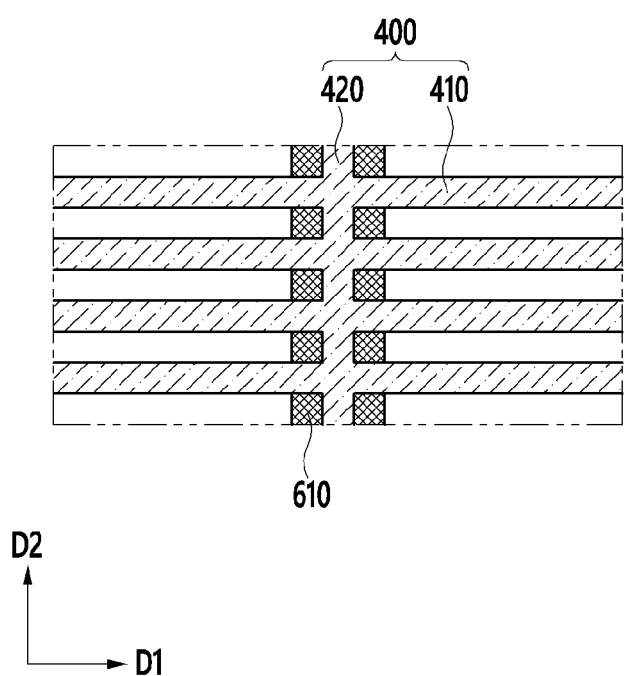
FIG. 18 is an enlarged top plan view of portion A of the display device of FIG. 17.

According to an exemplary embodiment, a display device includes a display panel including the wire grid polarizer 400 and a color conversion panel 600. FIG. 16 is a schematic cross-sectional view of an embodiment of a display device constructed according to the principles of the invention, FIG. 17 is a schematic perspective view of the wire grid polarizer of FIG. 15 and a portion of the color conversion panel of FIG. 16, and FIG. 18 is an enlarged top plan view of portion A of the display device of FIG. 17.

As illustrated in FIG. 16, the display device 1000 includes a color conversion panel 600, a display panel 500 which contacts the color conversion panel 600, and a light assembly 700.

According to an exemplary embodiment, the color conversion panel 600 includes a color conversion panel substrate 630, color conversion layers 620 disposed on the color conversion panel substrate 630, and light blocking members 610 disposed between the color conversion layers 620. Specifically, the color conversion panel 600 includes a plurality of color conversion layers 622 and 624 disposed on a surface of the color conversion panel substrate 630 which faces the display panel 500, which may be liquid crystal panel substrate as discussed subsequently, a transmission layer 626, and light blocking members 610 disposed between the transmission layer 626 and the plurality of color conversion layers 622 and 624.

The color conversion layers 620 may convert incident light into different colors of light, and may include, for example, a red color conversion layer 622 and a green color conversion layer 624. The transmission layer 626 may emit the incident light without color conversion. The transmission layer 626 may receive blue light and emit the blue light.

According to an exemplary embodiment, the color conversion layers 620 may include quantum dots 628. The quantum dots 628 may serve to change a wavelength of light passing through the color conversion layers 620, and may improve a light viewing angle by emitting light passing through the quantum dots 628 in all directions. The light blocking members 610 may define regions between adjacent color conversion layers 620 at which the red color conversion layers 622, the green color conversion layers 624, and the transmission layer 626 are disposed. The color conversion layers 620 and the adjacent light blocking members 610 may be partially overlapped with each other depending on the manufacturing process.

The display panel 500 may include a liquid crystal panel generating a vertical electric field, but the inventive concepts are not limited thereto. For example, the display panel may include a liquid crystal panel, a plasma display panel (PDP), an organic light emitting diode display (OLED), a surface conduction electron-emitter display (SED), a field emission display (FED), a vacuum fluorescent display (VFD), or an E-paper.

The display panel 500 may include a liquid crystal panel 510 for displaying images and a wire grid polarizer 400 disposed on one surface or both surfaces of the liquid crystal panel 510 to polarize light emitted from a light assembly 700.

The liquid crystal panel 510 includes a lower display panel 512 including a thin film transistor for displaying images and a liquid crystal layer 514 disposed on the lower display panel 512.

A plurality of pixel electrodes is disposed on a liquid crystal panel substrate 513*a* included in the lower display panel 512 in a matrix shape. A gate line (not illustrated), a gate insulating layer 513*b*, a semiconductor layer (not illustrated), a data line 513*c*, a drain electrode (not illustrated), a passivation layer 513*d*, and a pixel electrode 513*e* are disposed on the liquid crystal panel substrate 513*a*. The gate line includes a gate electrode (not illustrated) and extends in a row direction. The gate insulating layer 513*b* is disposed on the gate line. The semiconductor layer is disposed on the gate insulating layer 513*b*. The data line 513*c* and the drain electrode include a source electrode (not illustrated), are disposed on the semiconductor layer, and extend in a column direction. The passivation layer 513d is disposed on the data line 513c and the drain electrode. The pixel electrode 513e is physically and electrically connected to the drain electrode through a contact hole (not illustrated).

The semiconductor layer (not illustrated) disposed on the gate electrode forms a channel layer in an area exposed by the source electrode and the drain electrode, and the gate electrode, the semiconductor layer, the source electrode, and the drain electrode constitute one thin film transistor.

A common electrode 513f receiving a common voltage is disposed to face the pixel electrode 513e, interposing the liquid crystal layer 514 therebetween. The common electrode 513f may generate an electric field together with the pixel electrode 513e so that liquid crystal molecules 515 of the liquid crystal layer 514 are arranged in accordance with the generated electric field.

The liquid crystal layer 514 includes the liquid crystal molecules 515, and the alignment direction of the liquid crystal molecules 515 is controlled by an electric field between the pixel electrode 513e and the common electrode 513f It is possible to display images by controlling transmittance of light received from the light assembly 700 depending on the alignment of the liquid crystal molecules.

Although not illustrated, a first alignment layer disposed between the pixel electrode 513e and the liquid crystal layer 514 and a second alignment layer disposed between the common electrode 513f and the liquid crystal layer 514 may be further included.

The light assembly 700 may include a light source disposed below the display panel 500 for generating light, and a light guide panel (not illustrated) for receiving and guiding light in a direction toward the display panel 500 and the color conversion panel 600. When the display panel 500 is a self-emitting display device, the light assembly 700 may be omitted.

As an example of the inventive concepts, the light assembly 700 may include at least one light emitting diode (LED), e.g., a blue light emitting diode. The light source may be an edge-type light assembly disposed on one side surface of the light guide panel, or may be a direct-type light assembly 700 disposed directly below the light guide panel.

A polarizer 520 may be disposed below the liquid crystal panel substrate 513a adjacent to the light assembly 700 in order to polarize light generated from the light assembly 700 and supplied to the liquid crystal panel substrate 513a. At least one of a coating-type polarizer and a wire grid polarizer according to an exemplary embodiment of the invention may be employed as the polarizer 520. The polarizer 520 may be disposed at one surface of the display panel 500 in various forms such as a film form, a coated form, and an attached form. However, this description is one example, and the inventive concepts are not limited thereto.

As illustrated in FIG. 16, the display device 1000 includes the wire grid polarizer 400 and the display panel 500. Further, although not illustrated, the display device 1000 may further include a signal input unit (not illustrated) for receiving a signal inputted from the outside and a window (not illustrated) for protecting the display panel 500 and the signal input unit.

A portion of the display panel 500 including light blocking members 610 disposed at respective edges of sub-color conversion members 622, 624, and 626 is illustrated in FIG. 16 to FIG. 18. Each of the sub-color conversion members 622, 624, and 626 may respectively correspond to one of red, green, blue, and white, but the inventive concepts are not limited thereto. In addition, any color basic unit for displaying various colors may be included in the scope of the inventive concepts.

As described above, the light blocking members 610 are disposed around each edge of the sub-color conversion members 622, 624, and 626. The light blocking members 610 may prevent color interference between the sub-color conversion members 622, 624, and 626 by partially absorbing light emitted toward the light blocking members 610 from the light being transferred from the display panel 500 and having wavelengths that are changed by the color conversion layers 620, thereby more clearly realizing color ranges of light.

As described above, the embossed grid portions 410 are formed in the first direction in the wire grid polarizer 400 to apply polarize the light emitted from the display panel 500. The embossed grid bridge portions 420 formed in the second direction that intersects the first direction may have a direction that is different from the first direction for polarizing the light, thereby deteriorating an optical characteristic of the display device 1000.

Therefore, according to the principles of the invention, the embossed grid bridge portions 420 may be disposed on the light blocking members 610 absorbing light in order to prevent deterioration of the optical characteristic of the display device 1000 caused by the embossed grid bridge portions 420.

FIG. 18 is an enlarged view of portion A of FIG. 17, schematically illustrating a bridge pattern disposed on the light blocking members 610. FIG. 18 shows an example in which the embossed grid bridge portions 420 are disposed on the light blocking members 610 in a straight-line form such that the embossed grid bridge portions 420 are connected with other embossed grid bridge portions 420 adjacent thereto.

However, the inventive concepts are not limited thereto. For example, when the embossed grid bridge portions 420 are offset or misaligned from other embossed grid bridge portions 420 adjacent thereto, the embossed grid bridge portions 420 may be disposed on the light blocking members 610. Although not illustrated, the light blocking members 610 may be disposed at edges of pixels of the display panel 500. Accordingly, although offset from each other, the embossed grid bridge portions 420 may be designed to correspond to edges of the pixels, thereby maintaining an optical characteristic thereof.

Hereinabove, the master mold for manufacturing wire grid polarizer, the wire grid polarizer manufactured using the master mold 100, a manufacturing method of the wire grid polarizer, and the display device including the wire grid polarizer have been described.

According to exemplary embodiments, although the liquid resin is coated on a wire grid polarizer substrate, it is possible to prevent a defect caused by a capillary phenomenon and spread anisotropy of the liquid resin because of the existence of the embossed grid bridge portions of the wire grid polarizer. As a result, it is possible to prevent deterioration of optical characteristics caused by a defect in the manufacturing process of a wire grid polarizer and to improve product quality.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A master mold for manufacturing a wire grid polarizer, the master mold comprising:
 a mold substrate; and
 a mold part disposed on the mold substrate,
 wherein the mold part includes:
  a plurality of embossed portions extending in a first direction substantially in parallel with one another, each of the embossed portions having an elongate shape with opposed ends and a middle region between the ends defining a stripe-like pattern;
  a plurality of debossed portions, at least some of which are disposed between adjacent embossed portions, extending in the first direction and separating adjacent embossed portions; and
  a plurality of embossed bridge portions arranged in a second direction intersecting the first direction, the plurality of embossed bridge portions extending between the middle regions of adjacent embossed portions and being offset from adjacent embossed bridge portions.

2. The master mold of claim 1, wherein the plurality of embossed bridge portions are connected with adjacent embossed bridge portions.

3. The master mold of claim 1, wherein the plurality of embossed bridge portions are arranged continuously with adjacent embossed bridge portions.

4. The master mold of claim 1, wherein two or more embossed bridge portions are disposed in one debossed portion.

5. The master mold of claim 1, wherein the first direction and the second direction are substantially perpendicular to each other.

6. The master mold of claim 1, wherein the mold part comprises an uneven part having various heights defined at least in part by the plurality of embossed portions, the plurality of debossed portions, and the plurality of embossed bridge portions.

* * * * *